United States Patent [19]

Antikainen et al.

[11] 4,229,776
[45] Oct. 21, 1980

[54] CAPACITIVE CAPSULE FOR ANEROID PRESSURE GAUGE

[75] Inventors: Veijo Antikainen; Osmo Reittu, both of Vantaa, Finland

[73] Assignee: Vaisala Oy, Finland, Finland

[21] Appl. No.: 962,786

[22] Filed: Nov. 21, 1978

[51] Int. Cl.² .............................................. H01G 7/00
[52] U.S. Cl. ...................................... 361/283; 73/718
[58] Field of Search ................... 361/283; 73/718, 724

[56] References Cited

U.S. PATENT DOCUMENTS 4,120,206  10/1978  Rud ..................................... 361/283

OTHER PUBLICATIONS

Rosemont Eng. Bulletin 6626, Minneapolis, Minn., 1970, p. 3.

Primary Examiner—E. A. Goldberg
Attorney, Agent, or Firm—Steinberg and Blake

[57] ABSTRACT

A capsule for use in aneroid pressure gauges comprising a pair of membranes sealed to each other along peripherally extending side edge regions to define a sealed, interior space therebetween. One of the membranes is formed having a centrally located charge retaining region. A capacitor plate is fixed to the other membrane and is disposed within the sealed interior space in opposed relationship to the charge retaining region. The means by which the capacitor plate is fastened to its respective membrane is electrically conductive and extends through the membrane while being electrically insulated therefrom. Changes in pressure are measured by measuring the changes in the capacitance between the capacitor plate and charge retaining region, the latter changes being effected by the changes in the distance between the membranes resulting from pressure fluctuations. The aneroid capsule is particularly suited for use in connection with an aneroid pressure gauge utilized in radiosondes.

5 Claims, 2 Drawing Figures

CAPACITIVE CAPSULE FOR ANEROID PRESSURE GAUGE

BACKGROUND OF THE INVENTION

This invention relates generally to aneroid pressure gauges or barometers and, more particularly, to aneroid pressure gauges wherein changes in pressure are indicated by changes in capacitance resulting from the deflection of the membranes which define the evacuated capsule or cell forming a component of the pressure gauge. Aneroid pressure gauges are known which measure pressure by means of changes in the capacitance of associated components effected by the deflection of one of the membranes of the aneroid capsule forming a component of the pressure gauge. Thus, in one existing aneroid pressure gauge, an aneroid capsule or cell comprising a pair of membranes defining a sealed evacuated space between them has one of these membranes fastened to the chassis or housing of the pressure gauge. A capacitor is provided including one fixed capacitor plate and an opposed movable capacitor plate. The movable membrane of the aneroid capsule is fastened to the movable capacitor plate so that changes in pressure result in a deflection of the capsule membrane which, in turn, results in a corresponding movement of the movable capacitor plate thereby changing the capacitance of the capacitor. Thus, it is the output of the capacitor which is measured in order to obtain pressure measurements. Such capacitance type aneroid pressure gauges are particularly useful in connection with radiosondes which, among other things, measure minute changes in pressure over short intervals of time.

Aneroid pressure gauges of the type described above are not entirely satisfactory, however. Thus, the dielectric coefficient of the air gap between the capacitor plates of the above-described conventional aneroid pressure gauges is influenced by the moisture present in the ambient air as well as the ambient pressure and temperature. The influence of the ambient moisture, pressure and temperature on the dielectric coefficient of the air gap results in a non-linearity between the pressure and capacitance variations thereby resulting in measuring errors.

SUMMARY OF THE INVENTION

Accordingly, one object of the present invention is to provide a new and improved aneroid pressure gauge which effects changes in capacitance in accordance with changes in pressure.

Another object of the present invention is to provide such a new and improved aneroid pressure gauge which is mechanically stable and which has extremely good accuracy.

Still another object of the present invention is to provide such a new and improved aneroid pressure gauge which is relatively simple in construction and inexpensive to manufacture.

A further object of the present invention is to provide such a new and improved aneroid pressure gauge which eliminates the deleterious influences caused by the presence of ambient moisture, pressure and temperature.

Briefly, in accordance with the present invention, these and other objects are obtained by providing an aneroid capsule comprising a pair of membranes sealed to each other along respective peripherally extending side edge regions to define a sealed interior space therebetween. A capacitor plate is disposed within the sealed interior space and is affixed to one of the membranes by an electrically conductive supporting member which extends through that membrane but which is electrically insulated therefrom. The other membrane is provided with a charge retaining region located in opposed relationship to the capacitor plate. The capacitance of the device comprising the capacitor plate and the charge retaining region of the membrane is proportional to the ambient pressure by virtue of the movement of the capacitor plate located within the sealed interior space which corresponds to the movement of the membrane to which it is affixed. Since the space between the capacitor plate and the charge retaining region of the membrane is partially evacuated, the ambient moisture, pressure and temperature will have no affect on the dielectric constant of the space defined between the capacitor plate and the charge retaining region.

DESCRIPTION OF THE DRAWINGS

A more complete appreciation of the invention and many of the attendant advantages thereof will be readily appreciated as the same becomes better understood by reference to the following detailed description when considered in connection with the accompanying drawings in which.

DESCRIPTION OF THE PREFERRED EMBODIMENT

Figure 1:
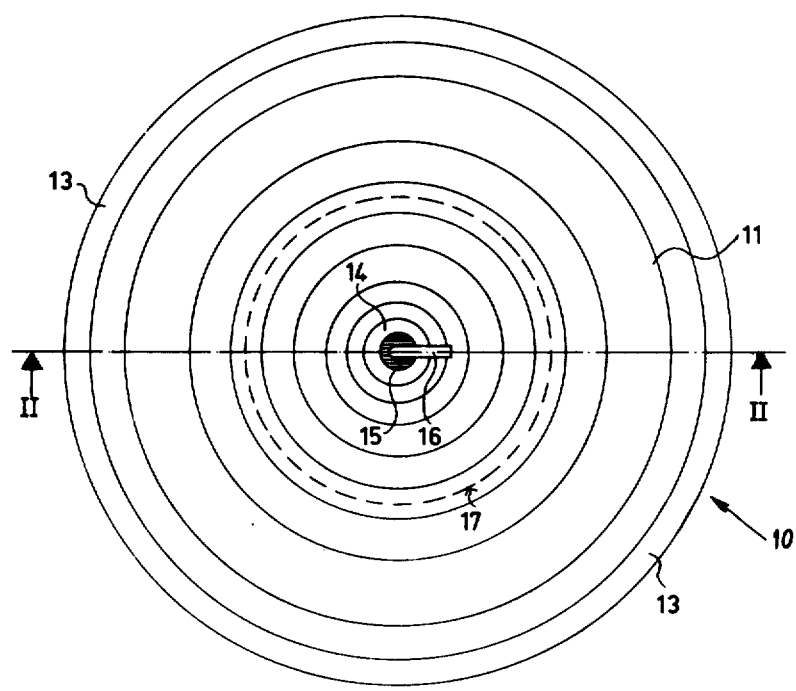
FIG. 1 is a plan view of the aneroid capsule of the present invention.
Figure 2:
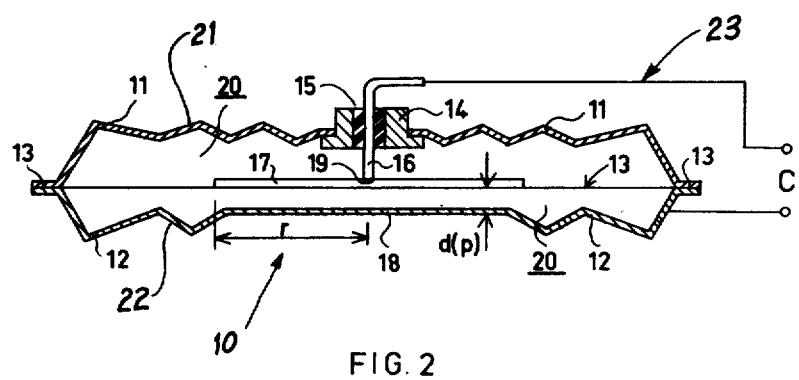
FIG. 2 is a section view taken along line II—II of FIG. 1.

Referring now to the drawings wherein like reference numerals designate identical on corresponding parts throughout the several views, the aneroid capsule or cell of the present invention, generally designated 10 is of generally conventional construction and includes a first, upper membrane 11 and a second lower membrane 12 which are sealingly engaged to each other along their perpherally extending side edge regions 13. Thus, a sealed interior space 20 is defined between first and second membranes 11, 12, which interior space is partially evacuated in a conventional manner.

The first, upper membrane 11 is formed having circular corrugations 21 extending over the substantial entire surface thereof. The second, lower membrane 12 also is provided with corrugations 22 which circumferentially extend around the outer regions thereof. Thus, each of the membranes 11, 12 have effective spring constants which govern the extent of deflection of the membranes as a result in changes in ambient pressure.

The second, lower membrane 12 is formed having a central planar region 18 which comprises a charge retaining portion. Thus, planar portion 18 is preferably of a circular configuration and is circumferentially surrounded by the corrugations 22.

A capacitor plate 17 is disposed within the evacuated sealed interior space 20 in opposed relationship to the charge retaining planar portion 18 of second membrane 12. Capacitor plate 17 preferably comprises a circular disc shaped member which is substantially similar in outer configuration to the planar charge retaining portion 18 of membrane 12. Capacitor plate 17 is supported within the sealed interior space 20 by connection, such as by resistance butt-welding, as its center portion 19 to the end of an electrically conductive pin 16. Pin 16 is fixed to the first membrane 11 by a sleeve 14 fixed to an opening centrally formed in membrane 11, sleeve 14 housing a cylindrically shaped member 15 formed of electrically insulative material.

The distance, designated d(p) between capacitor plate 17 and the charge retaining region 18 of the second, lower membrane 12 is substantially linearly dependent on the ambient pressure acting on aneroid capsule 10 in a conventional manner. Thus, the higher the ambient pressure, the smaller is the distance d(p). The sensitivity of the capsule, i.e., the extent of deflection resulting from a change in pressure, is determined by appropriately selecting the radius of the charge retaining region 18 and capacitor plate 17. Capacitor plate 17 is located at an appropriate distance from the charge retaining region 18 to achieve the desired sensitivity. It is preferable to locate the capacitor plate 17 and the opposed charge retaining region 18 at the substantial midsections of membranes 11, 12 since, at such location, maximum deflection of the membranes for a given change in pressure will occur.

Means are provided in the form of electrical leads 23 by which the capacitance C can be measured. Thus, the leads are connected to the ends of pin 16 and to second membrane 12, respectively.

Thus, as the first and second membranes 11, 12 deflect pursuant to pressure fluctuations, the distance d(p) will vary thereby changing the capacitance. This change in capacitance thus reflects changes in pressure.

Since the movable or "hot" capacitor plate 17 is disposed within the sealed, evacuated space between the membranes, the stability and mechanical integrity of the structure is improved. The space between the capacitor plate 17 and charge retaining region 18, as mentioned above, is partially evacuated and, therefore, is not subject to changes in its dielectric constant due to ambient moisture, pressure or temperature.

Obviously, numerous modifications and variations of the present invention are possible in the light of the above teachings. Accordingly, it is understood that within the scope of the claims, the invention may be practiced otherwise than as specifically recited herein.

What is claimed is:

1. An aneroid capsule apparatus for use in a pressure gauge comprising:
    a first membrane having a peripherally extending side edge region;
    a second membrane having a peripherally extending side edge region and a charge retaining region, said first and second membranes extending substantially parallel to and at a distance from each other and being sealingly engaged to each other along their respective peripherally extending side edge regions to define a sealed interior space between them which is partially evacuated;
    means passing through said first membrane and extending between said sealed interior space and the exterior of said capsule apparatus for supporting a capacitor element within said sealed interior space, said support means being electrically conductive;
    means for mounting said supporting means on said first membrane in electrically insulated relationship thereto for movement therewith; and
    a capacitor element located within such sealed interior space affixed to and supported by said electrically conductive support means in opposed relationship to said charge retaining region of said second membrane,
    whereby the changes in distance between said first and second membranes resulting from changes in ambient pressure are measured as a function of changes in capacitance of the capacitor plate and opposed charge retaining region of said second membrane.

2. Apparatus as recited in claim 1 wherein said capacitor element support means is fixed to said first membrane at the point where the amplitude of movement of said first membrane with respect to said second membrane is at its substantial maximum value.

3. Apparatus as recited in claim 1 wherein said capacitor element is substantially circular; said charge retaining region of said second membrane having a substantially similar shape as said capacitor element, and wherein said support means pass through the substantial center of said first membrane.

4. Apparatus as recited in claim 1 wherein said support means comprises an electrically conductive pin member and wherein said support mounting means comprises a sleeve affixed in an opening formed in said first membrane and a cylindrical member formed of insulative material disposed within said sleeve, said pin member being carried by said insulating sleeve.

5. Apparatus as recited in claim 1 wherein said capsule apparatus has a substantially circular configuration and is symmetrical with respect to a center line.

* * * * *